Nov. 1, 1938.     I. E. McELROY ET AL     2,135,348
VARIABLE SPEED PULLEY
Filed Aug. 8, 1936
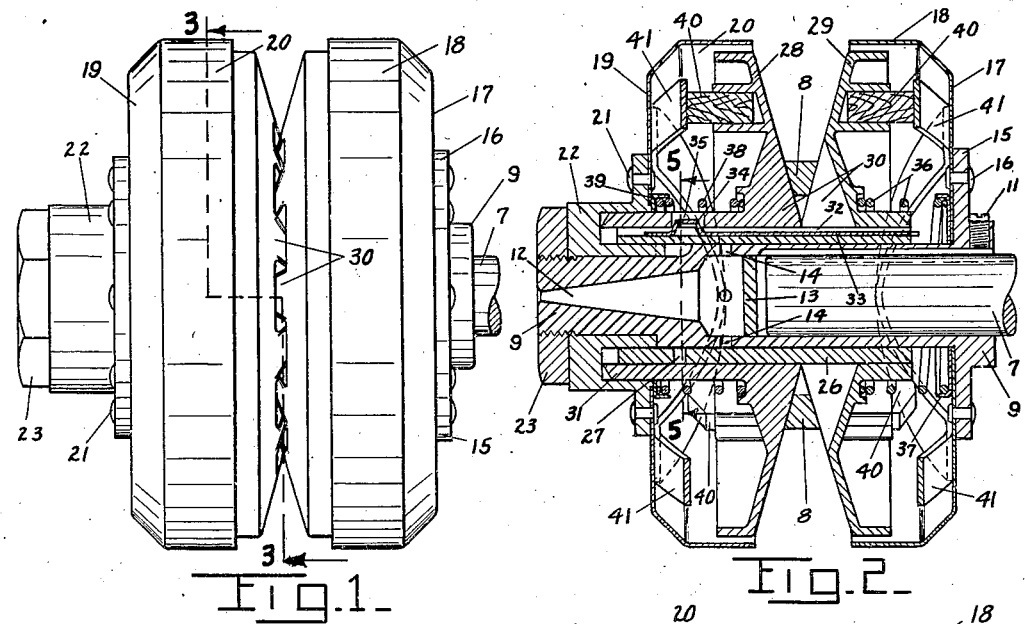
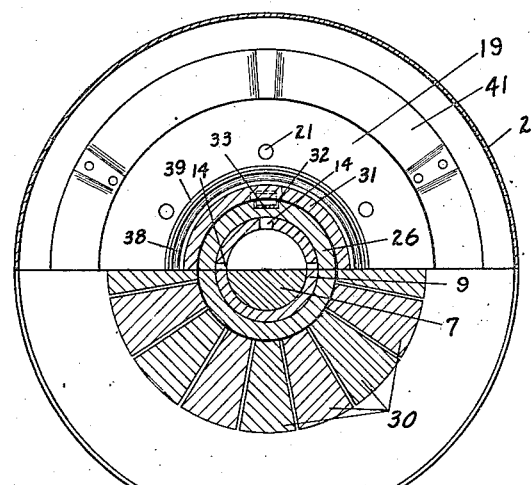
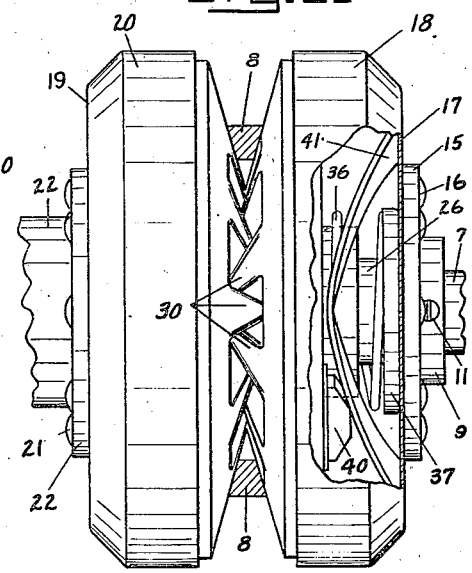
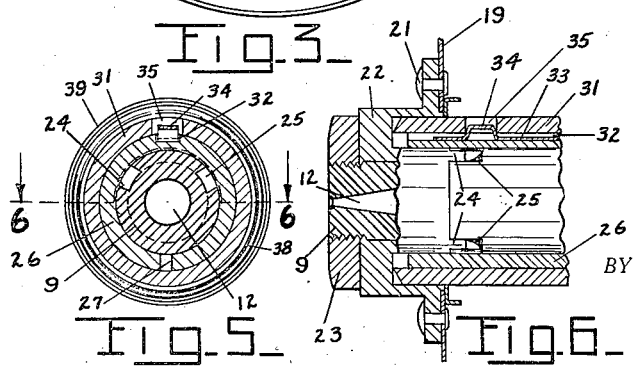
INVENTOR.
RICHARD H. SHADRICK
ISAAC E. McELROY
BY
ATTORNEY.

Patented Nov. 1, 1938

2,135,348

UNITED STATES PATENT OFFICE

2,135,348

VARIABLE SPEED PULLEY

Isaac E. McElroy and Richard H. Shadrick, Minneapolis, Minn., assignors to Minnesota Appliance Corporation, Minneapolis, Minn., a corporation of Minnesota Application August 8, 1936, Serial No. 94,956

7 Claims. (Cl. 74—230.17)

This invention relates to variable speed power transmission devices, and the primary object is to provide an automatic diameter adjustable pulley which is particularly an improvement over the pulley construction disclosed and claimed in our copending application Ser. No. 697,818, filed November 13, 1933, for Variable speed pulley, which application matured into Patent No. 2,050,358 on August 11, 1936. The present pulley operates on principles which are substantially similar to those disclosed in the earlier application and for that reason reference is made to the said Patent No. 2,050,358 for a more complete explanation of the construction, arrangement, and operation of parts, which are essentially the same in both instances.

While we have not departed from the fundamental theories or construction evidenced by our previous application, the practical and commercial development and study which followed our earlier efforts have resulted in changes and improvements which have greatly increased the efficiency of the unit, while also adding to its life, ruggedness, and smoothness of operation. These improvements include generally the following: Lengthening the effective bearing surfaces of the belt groove forming discs axially with respect to the supporting hub and without axially enlarging the pulley unit proper, to thereby reduce and eliminate all binding tendency or frictional resistance in the mechanism while being adjusted in response to variations in belt tension. The new pulley incorporates improved and novel means for lubricating all moving parts, and this means includes a lubricant distribution method which is favorably responsive to the action of centrifugal force, particularly when the pulley is being operated at high speeds. The structure also contemplates the use of contact driving blocks which are of sufficiently yieldable material to produce a cushioning action, and thereby eliminate chattering, vibration, jerking, etc., and which blocks are also of absorbent material whereby they will retain a lubricant oil and thus eliminate the otherwise frequent occasion for lubrication of the contact surfaces. Still other and more specific improvements and objects will be disclosed in the course of the following specification, reference being had to the accompanying drawing, wherein:

Fig. 1 is a side elevation of the pulley as mounted on a motor or power shaft, but with the belt removed and the pulley discs in a position forming a belt groove of maximum diameter.

Fig. 2 is a sectional elevation taken diametrically through the pulley structure and showing the belt in operative position at a greatly reduced pulley diameter.

Fig. 3 is a cross sectional elevation on the irregular line 3—3 in Fig. 1.

Fig. 4 is a side elevation similar to Fig. 1 but showing a belt in pulley constricting position and with a portion of the pulley broken away to expose the inner construction.

Fig. 5 is a sectional detail view on line 5—5 in Fig. 2, and

Fig. 6 is a sectional detail view substantially as on line 6—6 in Fig. 5.

Referring to the drawing more particularly and by reference characters, 7 designates a shaft upon which the pulley is mounted, and 8 designates the belt by which power is to be transmitted to a second or driven pulley, or, when so desired the variable or adjustable pulley may be the driven pulley. In either event the effective belt groove diameter of the variable pulley is increased or decreased by respectively decreasing or increasing the mean resistance or average tension between the tight and slack sides of the belt, and this can be accomplished in several ways, as pointed out in our Patent No. 2,050,358.

The pulley proper includes a central hub member 9 which is axially recessed at one end to receive the shaft 7, and the hub is non-rotatably secured on the shaft by splining or keying, as indicated at 10 in Fig. 2. The hub 9 may be secured against endwise displacement on the shaft by set screw 11.

The end portion of hub 9, opposite from shaft 7, is provided with a conical chamber 12, the apex of which opens to the end of the hub for receiving lubricating oil, and this it may be noted can be done even while the pulley is running. The chamber 12 is separated from the shaft recess by a tight fitting plug 13 inserted from the larger or recess end of the hub, and the chamber 12 is preferably filled with an absorbent packing material (not shown) to retain the lubricant or oil inserted through the axial end aperture. The conical form of the chamber wall will cause the lubricant coming in contact therewith to move or flow inwardly toward discharge apertures 14, under the action of centrifugal force, while the absorbent packing will have a tendency to prevent a too rapid discharge through the apertures. In this manner the pulley can quickly and easily be lubricated from time to time, and while in operation if necessary, and the normal rotation will be effective to produce uniform feed of the lubricant to the friction contact surfaces of the hub assembly.

The shaft (7) end of the hub member 9 is provided with a flange 15 to which is rigidly secured by rivets 16 a plate 17 having an inwardly projecting peripheral flange 18, forming a generally cup shaped shell. A similarly formed but reversely faced shell 19—20 is secured by rivets 21 to a collar 22 that fits upon a reduced end of the hub 9 and is removably secured thereto by a nut 23 which also serves to releasably hold the entire pulley assembly together. It is important that the two shell members be non-rotatably secured with respect to each other and to that end we provide an inner end of the collar member 22 with a pair of spaced lugs 24 for endwise engagement in notches 25 in the hub material (see Figs. 2, 5, and 6).

A bearing sleeve 26 is mounted on the hub member 9 and has freedom for limited oscillating and endwise movement thereon, such movement occurs when the effective diameter of the pulley is changed and in order to reduce friction and insure proper automatic adjustment of the sleeve it must move freely on the hub. For this reason the oil discharged through perforations 14 comes into direct contact with the inner surface of the sleeve to properly lubricate the same. It is also necessary to lubricate a part of the outer surface of the sleeve, as another pulley member is mounted for sliding movement thereon, and to that end we provide the sleeve 26 with one or more perforations 27 to conduct oil from the inner bearing surfaces. It should be noted, however, that the perforations or ducts 14 and 27 are offset with respect to each other so as to retard the oil movement and insure proper lubrication of both inner and outer sleeve surfaces.

The sleeve 26 supports the two groove forming pulley sections or discs 28 and 29, which sections are of the conical, telescopic type having interlacing spokes 30. The section 29 is mounted on the right end of the sleeve 26, as shown in Fig. 2, and is rigidly secured thereto by any suitable means, in the present case it having a driving fit on the sleeve. Consequently the section 29 rotates with the sleeve 26 on the hub 9, and because of the long bearing surface for the sleeve there is no appreciable tendency of the section to bind or stick on the hub under the somewhat angular or oblique pressure resulting from the belt tension in the pulley groove.

The other pulley section, 28, is mounted for sliding movement on the sleeve 26, and in order that it may have as long an axial bearing surface as possible, we provide it with a collared extension 31 which slidably embraces the sleeve 26 and extends into a recess in the collar 22 as best shown in Figs. 2 and 6. As previously mentioned, the perforations 27 in the sleeve 26 permit a sufficient amount of oil to flow outwardly to provide proper lubrication for the movement of the section 28 on the sleeve 26.

It may be noted with particular reference to Figs. 2, 3, 5, and 6, that the sleeve 26 is provided with a longitudinally extending channel or keyway 32 in which is slidably seated a key 33 having a hump 34 extending upwardly into a hole 35 in the section collar 31. The purpose of this arrangement is twofold. The main object of the key and slot arrangement is to maintain the registering arrangement of the spokes 30 when they are by any chance separated beyond the position shown in Fig. 2, which sometimes occurs when the pulley groove is adjusted to its very smallest diameter. A second purpose of the key arrangement 33 is to insure the proper belt alignment and prevent any possibility of the belt coming in contact with the flanges 18 or 20 when the pulley is adjusted to the large diameter condition, as shown in Fig. 1. Under such circumstances the key 32 moving to the right with section 28 projects beyond the right end of the sleeve 26, as shown in Fig. 2, to stop against the plate 17, and thereby prevent the longitudinal movement of the sections 28 and 29 beyond the desired or normal position of rest, as might occur particularly when the pulley is operated on a vertical axis, and the weight of the sections has a tendency to move them downwardly beyond the point of belt alignment.

A compression spring 36 is disposed between the pulley section 29 and a cup washer 37 resting against the plate 17; and a similar coil spring 38 is compressed between the section 28 and a retention ring 39, which abuts against the collar 22. These springs 36 and 38 do not in any way constitute driving or power transmission elements or connections as between the hub 9 and the groove forming discs 28 and 29. They do, however, have an important function in the normal operation of the pulley, and that is to establish the initial disc contact with the belt and to some extent assist in centering the discs in proper belt alignment as well as to eliminate noise and vibration. A further function of the springs is to maintain belt contact in such a manner as to prevent the so-called surging action which sometimes develops in the power line, and particularly when the driven shaft or element may momentarily exceed the speed of the driving shaft or motor.

Driving connection from the hub 9 to the groove forming discs or members 28 and 29 is established through a series of blocks 40 carried by the discs and arranged to contact with cam acting surfaces of strap members 41 rigidly secured to the inner surfaces of the plates 17 and 19. These members 41 are circular or ring shaped in plan (Fig. 3), but in side elevation or peripheral contour are reversely curved (Figs. 2 and 4), and in the present instance with three serpentine undulations in each ring. The blocks 40 have freedom for limited oscillating movement between opposite cam surfaces and will contact with such respective surfaces depending upon the direction of driving rotation. The position of the blocks with respect to the high and low points of contact with the cams, or the spread between the sections 28 and 29 forming the effective belt groove diameter, is determined entirely by the belt tension, or rather by the mean tension between the tight and slack sides of the belt, as explained more fully in our Patent No. 2,050,358. In the prior case, however, the cam acting surfaces were metal to metal contact, and while operative did not prove entirely satisfactory when subjected to hard and long usage. It was found difficult to maintain the cam contacting surfaces lubricated as it was difficult to apply the lubricant at sufficiently frequent intervals, and centrifugal force tended to throw the lubricant away from the friction surfaces. This resulted in a certain amount of cutting, chattering, vibration, and noise. In the present instance, however, we have entirely eliminated these objections and substantially improved the efficiency and smoothness of operation, by providing the wide contact surfaces of the rings 41, and by making the blocks 40 of oil impregnated and slightly resilient material. As the undulated cam rings 41 are only attached at peripherally spaced points they provide a certain amount of resiliency against sharp contacts and shocks. Such actions, however, are primarily absorbed by the blocks 40 which are preferably of wood or fibre, and being detachable can be easily replaced if and when necessary. Of greater significance, however, is the fact that the contact blocks are formed of a material that is sufficiently porous to receive and retain a lubricant fluid such as oil so that the ring (41) engaging or contacting surface will at all times be sufficiently lubricated to prevent destructive wear or objectionable noise. It will also of course be obvious, particularly when the blocks have been impregnated under pressure, that the oil will be retained against the action of centrifugal force which is particularly noticeable at this distance from the axis of rotation.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A variable speed pulley comprising a hub forming spindle, a sleeve slidably mounted on the spindle, a belt groove forming disc secured rigidly upon one end portion of the sleeve so as to be adjustable therewith, a second belt groove forming disc mounted upon the opposite end portion of the sleeve and slidable with respect thereto for adjustment relative the first mentioned disc to thereby permit adjustment of the effective diameter of the belt groove, and cam acting means carried by opposite ends of the spindle and for engagement with the respective discs to establish driving connections therewith.

2. A variable speed pulley comprising a hub forming spindle, a sleeve slidably mounted on the spindle, a belt groove forming disc secured rigidly upon one end portion of the sleeve so as to be adjustable therewith, a second belt groove forming disc mounted upon the opposite end portion of the sleeve and slidable with respect thereto for adjustment relative the first mentioned disc to thereby permit adjustment of the effective diameter of the belt groove, spring means normally urging the discs toward each other to establish initial disc contact with a belt in the groove, and cam acting means carried by opposite ends of the spindle and for engagement with the respective discs to establish driving connections therewith.

3. A variable speed pulley comprising a hub having a casing shell rigidly secured to one end, a collar removably secured upon the other end of the hub and supporting a reversely faced complemental casing shell, a sleeve slidably mounted on the hub, said collar having an annular groove adapted to receive one end of the sleeve, a pair of belt groove forming conical discs mounted on the sleeve and for axial adjustment to permit variance of the effective belt groove diameter in response to changes in belt tension, and means establishing variable driving connections between the discs and said casing shells.

4. A variable speed pulley comprising belt groove forming discs and means supporting the same for limited axial movement, side members supported adjacent the said discs and having cam acting surfaces adjacent to the said discs, and resilient, lubricant impregnated contact elements carried by the discs in contact with the said cam acting surfaces and effective to permit limited oscillating movement of the discs.

5. A variable speed pulley comprising a pair of belt groove forming discs, means supporting the discs for limited axial movement, a side member supported adjacent each disc and having cam acting surfaces turned toward the discs, and contact elements of resilient, lubricant impregnated material, rigidly supported on the discs in sliding contact with the said cam acting surfaces to thereby effect limited oscillating movement of the discs.

6. A variable speed pulley comprising a pair of belt groove forming discs, means supporting the discs for limited axial movement, a side member supported adjacent each disc, an annular strap member secured at circumferentially spaced points to each side member and having intervening undulations extended toward the discs, and contact members of resilient, lubricant impregnated material rigidly secured to the discs in sliding contact with the said strap members to thereby effect limited oscillating motion of the discs.

7. A variable speed pulley comprising a pair of belt groove forming discs, means axially supporting the discs for limited sliding motion toward and away from each other, side members supported adjacent the said discs, cam acting means supported by the side members adjacent the discs, and lubricant impregnated contact elements on the discs having slidable contact with the cam acting means to thereby effect limited axial and oscillating movement of the discs.

ISAAC E. McELROY.
RICHARD H. SHADRICK.